United States Patent
Amengual Pericas

(10) Patent No.: US 8,850,765 B2
(45) Date of Patent: Oct. 7, 2014

(54) SYSTEM OF DIRECT FUSIBLE ANCHORING FOR A SUPPORT POST OF A SECURITY BARRIER OR PARAPET IN RIGID GROUND

(75) Inventor: Antonio Amengual Pericas, Asturia (ES)

(73) Assignee: Hierros y aplanaciones, S.A., Corvera de Asturias (ES)

( * ) Notice: Subject to any disclaimer, the term of this patent is extended or adjusted under 35 U.S.C. 154(b) by 1170 days.

(21) Appl. No.: 12/680,898

(22) PCT Filed: Apr. 17, 2008

(86) PCT No.: PCT/ES2008/000253
§ 371 (c)(1),
(2), (4) Date: Jul. 9, 2010

(87) PCT Pub. No.: WO2009/043947
PCT Pub. Date: Apr. 9, 2009

(65) Prior Publication Data
US 2010/0293870 A1  Nov. 25, 2010

(30) Foreign Application Priority Data

Oct. 1, 2007  (ES) .................................. 200702562

(51) Int. Cl.
| | | |
|---|---|---|
| *E02D 27/00* | (2006.01) | |
| *E02D 27/32* | (2006.01) | |
| *E01F 15/04* | (2006.01) | |
| *E01F 9/018* | (2006.01) | |
| *F16B 43/00* | (2006.01) | |
| *E01F 9/011* | (2006.01) | |
| *F16B 31/00* | (2006.01) | |

(52) U.S. Cl.
CPC ........... *E01F 15/0476* (2013.01); *E01F 9/0182* (2013.01); *F16B 43/003* (2013.01); *E01F 9/0117* (2013.01); *E01F 9/0116* (2013.01); *F16B 31/00* (2013.01)

USPC .................................. 52/296; 52/169.9; 52/98

(58) Field of Classification Search
USPC .............................. 52/98, 99, 169.9, 296, 297
See application file for complete search history.

(56) References Cited

U.S. PATENT DOCUMENTS

| | | | |
|---|---|---|---|
| 4,813,199 A | 3/1989 | Lewis, Jr. | |
| 4,926,592 A | 5/1990 | Nehls | |
| 5,088,683 A | 2/1992 | Briden | |
| 5,596,845 A * | 1/1997 | Strizki | .............................. 52/98 |
| 5,855,443 A * | 1/1999 | Faller et al. | ....................... 403/2 |
| 6,910,826 B1 | 6/2005 | Damiano | |

(Continued)

FOREIGN PATENT DOCUMENTS

| | | |
|---|---|---|
| DE | 3142432 A1 | 5/1983 |
| DE | 3343085 A1 | 2/1985 |

(Continued)

OTHER PUBLICATIONS

International Search Report, mailing date Sep. 24, 2008, for corresponding International Application No. PCT/ES2008/000253.

*Primary Examiner* — Elizabeth A Plummer
(74) *Attorney, Agent, or Firm* — Intellectual Property Law Group LLP

(57) ABSTRACT

The present invention relates to a device for the anchoring in rigid ground such as decks or floors made of concrete, asphalt, rock etc., for support posts for safety barriers and parapets, by means of bolts partly embedded in the ground and fixed to same by chemical or mechanical means, whose emergent part successively traverses the anchor plate of the post of the barrier, one or more washers and closure nuts which are what fix the bolt to the anchor plate. The washers present the capacity to behave as fusible elements which, in the event of a vertical load due to traction greater than a defined value, are deformed and traversed by the closure nut which, once released from the washer, traverses the corresponding hole of the anchor plate, which is of a size greater than that of the closure nut, with the union between the plate and bolt thus becoming decoupled.

2 Claims, 13 Drawing Sheets

(56) References Cited

U.S. PATENT DOCUMENTS 7,955,023 B2 * 6/2011 Sung et al. .................. 404/10
8,161,698 B2 * 4/2012 Migliore ...................... 52/295

FOREIGN PATENT DOCUMENTS

| | | | |
|---|---|---|---|
| EP | 1650351 | A2 | 4/2006 |
| ES | 2161204 | T1 | 2/2000 |
| ES | 2219221 | T3 | 12/2004 |
| JP | 2157308 | A | 6/1990 |
| JP | 2236306 | A | 9/1990 |
| JP | 11117245 | A | 4/1999 |
| NL | 7008705 | A | 12/1971 |
| WO | WO2006075923 | A2 | 7/2006 |

* cited by examiner

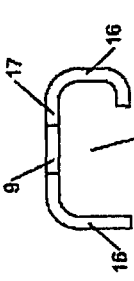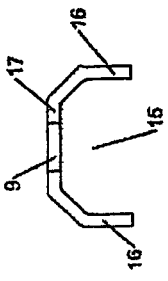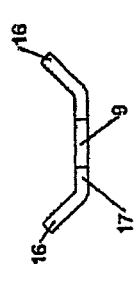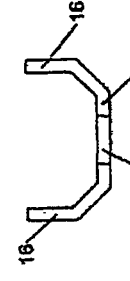

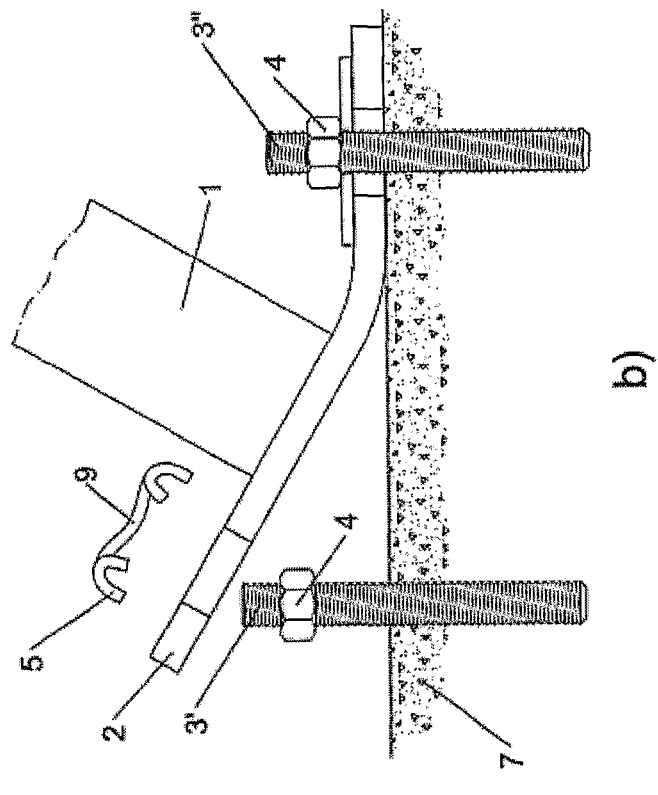
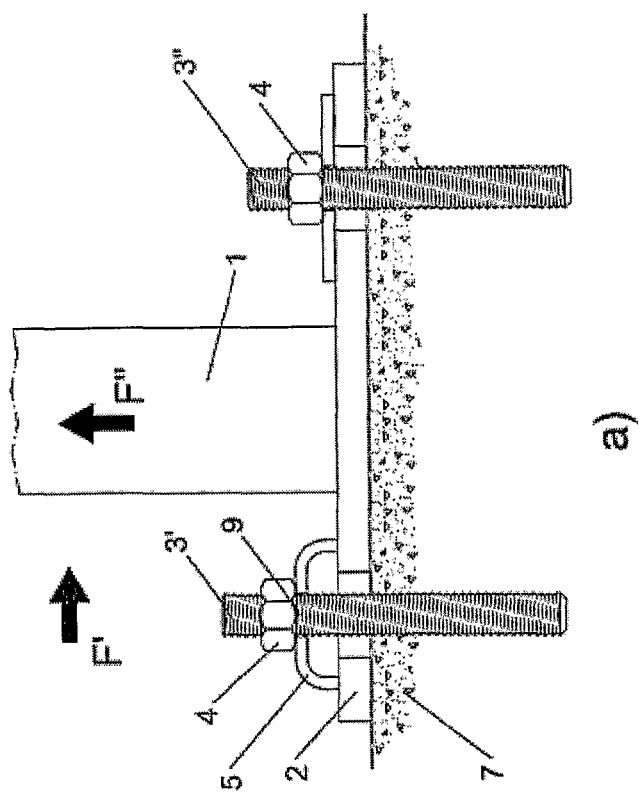
FIG.13

SYSTEM OF DIRECT FUSIBLE ANCHORING FOR A SUPPORT POST OF A SECURITY BARRIER OR PARAPET IN RIGID GROUND

OBJECT OF THE INVENTION

The present invention relates to an anchoring device for safety barriers or parapets for roads having application in rigid type ground or substrates (concrete, asphalt, rock, etc.) which permits fixing of the vertical support-securing elements of the safety barriers for roads, of use in road safety, in rigid ground with the capacity to behave in a manner that is fusible, in other words, releasing the union between the vertical support element for the barrier and the ground, starting from a certain level of impact energy.

STATE OF THE ART

In practice, there exist various types of vehicle containment system, this being understood as any device installed on a road with the aim of providing retention and redirecting of a vehicle which comes off the road out of control, reducing the severity of the accidents produced, such that damages and injuries are limited, both for the occupants and for other road users and other people or objects located in the vicinity. Safety barriers, parapets, impact attenuators and braking sandpits are all vehicle containment systems.

Two of the commercially most common containment systems are metal safety barriers, used on roadsides and the central reservations of roads, and metal parapets, which are similar to safety barriers, but are specifically designed for the edges of decks for crossing structures (bridges, viaducts, etc.), the crowns of retaining walls and other similar situations. The aim of these elements is to resist vehicle impacts thereby preventing them from passing through and thus guaranteeing the protection of third parties, and at the same time proceeding to carry out a controlled redirection and deceleration in such a way that the vehicle comes out of the impact stably and continues to travel at a reduced speed alongside the containment system in the original direction of the traffic, thereby guaranteeing the safety of the occupants of the vehicle and of other road users.

In practice, commercial containment systems present various designs: there exist safety barriers or parapets composed of one or more continuous horizontal fences or rails at different height supported on uprights or posts that are vertical or slightly inclined, arranged at regular intervals and barriers formed from a continuous wall (sometimes continuous and modulated) with different straight sections, with or without an upper handrail, anchored to the ground at regular intervals or simply supported.

Containment systems, and in particular safety barriers and parapets, must in general be conceived so that they are capable of providing an adequate response to the impact of different kinds of vehicles using roads: light vehicles such as cars and heavy vehicles such as lorries and coaches. Sometimes, even, safety barriers and parapets have to be designed for behaving safely towards impact from other vulnerable users, such as motorcyclists and cyclists.

In accordance with the existing applicable standard (EN 1317-2 in Europe and NCHRP 350 in the USA), prior to use, metal barriers and parapets are subjected to certain standardised crash tests at the real scale in which a controlled impact is performed between a standard vehicle and a containment system, permitting its behaviour to be assessed qualitatively and quantitatively. A containment system satisfactorily complies with a crash test at the real scale when the acceptance requirements and criteria defined in the standard are met in terms of containment level, severity of the impact, stability of the vehicle, deformation and angle of exit, and as a consequence it guarantees certain adequate conditions of safety, mainly for the occupants of the vehicle undergoing the impact and for third parties. It is then affirmed that a containment system has the capacity to contain a certain type of vehicle.

Except for those safety barriers and parapets which simply rest on the ground, other safety barriers and parapets (the great majority) are grounded, inserted or anchored in the ground.

When the ground is soft, as in the case of earth or earth with loose stones, the type of foundation normally used is partial insertion of the vertical support in the ground, remaining partly embedded therein. When the ground is rigid, as in the case of bridge decks or floors of concrete, asphalt, compacted rock, etc., the most usual type of foundation consists of fixing the base plate of the vertical post in the ground by means of a set of anchor bolts partly embedded in the ground and integral with it, which vertically traverse individual holes made for the purpose in the base plate, in such a way that the upper part of the bolts remain above the base plate and are fixed to it by means of screwed attachments (set of bolt, nut/s and washer/s). Another kind of rigid anchoring foundation consists of the union between an anchor plate embedded in the ground and integral with it and a base plate of the vertical support or post, by means of suitable fixing elements (mainly screws, and, exceptionally, welding).

The behaviour of a vehicle containment system in the event of impact from a vehicle depends on and includes its anchoring or foundation. On the one hand, the response of the anchoring in the event of impact conditions the behaviour of the system. An excessively rigid anchoring or one which decouples from the ground too late can lead to an undesired reaction of the barrier or parapet against the vehicle which has an adverse effect on its stability. If the vehicle turns over, the result of the test is negative. An overtly "soft" anchoring or a premature decoupling can lead to an excessive transverse deformation of the system, with the vehicle becoming embedded in to as it tips over and possible breaching of the system, with negative results. On the other hand, in the case of anchors on bridge decks, the crowns of retaining walls and similar structures, a poor behaviour of that anchor can cause destruction of the deck by punching a hole in it or shearing it. In the event of destruction of the deck, its rehabilitation is very difficult and costly.

In the case of bridge parapets, the use of rigid vertical posts permits reduced transverse deformations to be achieved along with a good longitudinal redirection of the vehicle, but they transmit large loads from the impact to the anchor, in such a way that if the anchoring is of the rigid type (for example, the simple union of the bolt with a conventional nut and washer) then it causes destruction of the ground in the environs of the anchor. If, on the other hand, the vertical post of the parapet is deformable, the loads transmitted to the ground once the post has collapsed are far less but the transverse deformation can become unacceptably high.

A type of high containment barrier or parapet capable of offering an efficient behaviour by guaranteeing a reduced transverse deformation and at the same time a transmission of actions to the ground limited to a maximum load value is that which incorporates an anchor of the "fusible" or of the "ductile" type.

The "fusible" type of anchor consists of an anchor plate embedded in the ground and integral with it, with a set of vertical cylindrical holes with an internal thread such that the vertical support, post or upright of the barrier or parapet is fixed to that plate by means of screws which pass through the base plate of the post and are screwed into the internal thread of the holes in the anchor plate. At a certain height, the screws might possibly have a throat of narrower diameter than that of its main body with the aim of guaranteeing that the breakage thereof always occurs in the narrowed section. In the event of impact from a heavy vehicle, the breakage of the union screws to the plate of the anchor post, starting from a certain value if load, decouples the post from the ground in such a way that the transmission of loads to it ceases.

On the contrary, the "ductile" type anchoring consists of a vertical deformable anchor bolt, partly embedded in the ground which has a free chamber situated just below that bolt, in the direction of impact from a vehicle, in such a way that in the event of impact by a heavy vehicle the bolt becomes deformed inside the chamber and, in an extreme case, it even breaks. In this way, the maximum load that can be transmitted to the deck prior to the collapse of the bolt is also limited thanks to the expansion chamber. There exist more or less complex variants of this mechanism though at all times maintaining the same basic functioning principle.

The anchors of the "fusible" and "ductile" type that are known so far are very efficient in high containment barriers or parapets (those capable of retaining very heavy vehicles) which are inserted in rigid ground such as bridge decks, the crowns of retaining walls, the floors of narrows central reservations, etc., but they raise the drawback that they require the construction of at least the surface part of the ground around the anchor, since they incorporate embedded elements that are housed in the surface part thereof, in such a way that, in order to introduce them, they require the carrying out of civil work, which means that they are not suited for rigid ground that has already been constructed (for example, the decks of existing bridges). Indeed, this type of anchor cannot be executed without breaking up part of the ground and then reconstructing it again and, moreover, it raises serious difficulties when it comes to guaranteeing the strength of the connection of this surface part of the ground with the rest of the underlying structure.

For that reason, in order to execute the anchor of a barrier or parapet in rigid ground that has already been constructed, one usually resorts to a simple rigid type anchor with a set of bolts partly embedded in the ground and some unions screwed with a conventional nut and washer via the base plate of the post. This type of anchor makes it necessary to use deformable posts which collapse at not very high levels of load (since once collapsed the post ceases to transmit the load to the anchor) and which require the provision of numerous horizontal rails or elements of great rigidity, in addition to subsequent costly horizontal or diagonal staying, in order to limit the transverse deformation to reasonable levels.

All these types of barrier or parapet anchor are simple or direct systems, in which a single fixing element is what is going to be embedded in the ground and what is also going to provide the union with the base plate of the support post.

In rigid ground that has already been constructed, the only alternative for executing a "fusible" type anchor that currently exists is to execute a composite or indirect anchor system, consisting of an anchor plate which is arranged on the surface of the ground and is made rigidly integral with it by means of direct anchor bolts partly embedded in the ground, and other different fixing elements for the anchor plate with the base of the post, of the type that are fusible and integral with the anchor plate but not with the ground. So, two types of independent fixing elements are provided, both attached to the anchor plate but some elements rigidly fix the latter to the ground and others fix the anchor plate to the base of the post of the barrier or parapet. This type of indirect or composite anchor is very costly since it requires an anchor plate that is very thick (it has to be non-deformable during impact) and of large dimensions, since it has to house the two types of fixing elements independently.

The components of the anchors that are described, namely, the bolts, nuts, washers, spacers, along with the base plate and the posts are generally metallic (being made of steel or aluminium, for example), but they could also be manufactured from other non-metallic materials.

DESCRIPTION OF THE INVENTION

The present invention provides a mechanism of direct or simple anchoring in rigid ground (concrete, asphalt, rock, etc,) for safety barriers and parapets of the kind composed of vertical supports or posts at regular intervals which sustain one or several horizontal continuous fences or rails, said anchor having a "fusible" nature, in other words, it is capable of releasing the union between the base of the post of the barrier or parapet and the ground during impact from a heavy vehicle, starting from a defined load level and said anchor being able to be executed on already constructed ground without any need to break it up in order to embed the anchoring elements and then having to reconstruct the ground afterwards.

The anchoring mechanism forming the object of the present invention consists of one or more vertical anchor bolts (3) partly embedded in the rigid ground (7) and rigidly joined to it by preferably mechanical or chemical means, each one of which presents an emergent part which passes vertically through the base plate (2) of the vertical support (1) of the safety barrier or parapet, passing through the corresponding hole (6) of the base plate (2) and fixed to it by means of one or more closure nuts (4) and one or more fusible washers (5), the latter being located beneath the closure nuts and above the plate, as shown in FIG. 1 and in FIG. 3.

The fusible washer (5) consists of a piece of cross-section preferably in the form of a "U", as shown in FIG. 2, but which can also present other geometries such as a plane cross-section, a cross-section in the form of a "C", in the form of an "omega", symmetric or asymmetric, with a cap that is spherical, trunco-conical or trunco-pyramidal, and so on (see FIGS. 4a-4p), being located beneath the closure nut (4) and presenting a hole (9) for the purpose of being traversed by the bolt (3), known as the bolt passage hole, said hole (9) being designed in such a way that it is capable of being deformed by the pressure of the closure nut (4) when the post (1) is subjected to a vertical traction stress, allowing the closure nut (4) to first of all deform, then tear and finally traverse the fusible washer (5) and afterwards the corresponding hole (6) of the base plate (2), thereby releasing the union of the base plate (2) with the anchor bolt (3) and, consequently, the latter with the ground (7). For the closure nut (4) to be able to traverse without difficulty the corresponding hole (6) of the base plate (2) of the post (1), which is normally of greater thickness than the washer, the size of that hole (6) has to be larger than that of the nut (4).

When the fusible washer (5) has the shape of a "U", "C" or "omega", or it has a cap that is spherical, trunco-conical or trunco-pyramidal with the hole (9) for passage of the bolt (3) located in its upper face, the free space (15) located beneath that hole (9) and above the base plate (2) allows the deformation of the hole (9) by the closure nut (4) to take place without interference of the latter by contact with the plate.

A constructive alternative to that described above is achieved with the fusible washer (5") preferably in the shape of a "U", "C", "omega", plane, or with a spherical, trunco-conical or trunco-pyramidal cap, arranged in the anchor unit the reverse way round, in other words, with the face containing the hole (9) for passage of the bolt (3) located in the lower part of the washer (5"), as shown in FIG. 7. In that case, the anchor mechanism has to incorporate a spacer element (12) located between the lower face of the washer (5") and the base plate (2) of the post (1), in such a way that a free space is created beneath the hole (9) for passage of the bolt, which will facilitate the deformation, tearing and passage of the closure nut (4) via the hole (9).

In order to guarantee the correct positioning of the unit formed by the anchor bolt (3), the closure nut (4) and the fusible washer (5), during the installation of the post (1) for the barrier or parapet, it is necessary to achieve a proper centring of that unit with respect to the hole (6) for the base plate (2), so that when the anchor union is released, the closure nut (4) does not clash with edges of the corresponding hole (6) of the anchor plate (2). This "centring" of the bolt (3) in the hole (6) is achieved by means of one or more centring nuts (11), fixed around the bolt (3), located above the level of the ground (7) and below the fusible washer (5), preferably contained inside the hole (6) of the base plate (2), as indicated in FIG. 5.

The functioning mechanism of the fusible anchor with bolt (3), nuts (4) (11) and fusible washer (5) is illustrated in FIG. 8. When the post (1) with base plate (2) of the barrier or parapet receives an impact from a vehicle and transmits a vertical traction load to the upper fusible anchor unit at a given threshold level or value, the hole for passage of the fusible washer (5) starts to become deformed by the pressure of the closure nut (4), due to the post (1) being stressed upwards with a certain force and the bolt (3) and the closure nut (4) remaining integral with the ground (7). As the pressure of the nut (4) on the passage hole (9) increases, the washer (5) becomes deformed by its passage hole (9) and the base plate (2) moves by being slid upwards, until the closure nut (4) ends by tearing the hole (9) and passing completely through it, at which moment the union between the bolt (3) and the base plate (2) become released, and decoupling takes place. As of that instant, the transmission of load to the ground (7) via the anchor bolt (3) ceases. This decoupling mechanism allows very good control over the load conditions for which the release of the union takes place so that, when applied to a safety barrier or parapet, it permits the magnitude of response to be obtained that the desired behaviour demands for that barrier or parapet.

In this way, a fusible anchoring is achieved with controlled behaviour that guarantees the decoupling of the anchor for a defined load and the conservation of the rigid ground without damage during impact by a heavy vehicle and which, moreover, can be executed in a manner that is direct and easy by means of the simple partial insertion of the anchor bolt itself (3) into the ground (7), without any need to break up the surface part of the ground. The anchor bolt (3) is preferably embedded in a cylindrical drill-hole previously made for the purpose in the surface part of the ground and is fixed to it by chemical or mechanical means.

Two or more anchor bolts (3) with a fusible washer mechanism (5) can be arranged in a single base plate (2). A constructive variant of the fusible mechanism with bolt (3) and fusible washer (5) described previously can be achieved by having a single washer (5') for two or more anchor bolts (3), as shown in FIG. 6.

This type of direct fusible anchor can also be carried out with two or more fusible washers per bolt, arranged successively one on top of the other, around the same anchor bolt (3) and beneath the same closure nut (4), as illustrated in FIG. 9 and FIG. 10. The arrangement of two or more fusible washers (5) and (13) on a single anchor bolt (3) permits the threshold level of the fusibility load to be increased without having to do this at the cost of increasing the thickness of a single fusible washer (5). The use of a single very thick fusible washer (5) is prejudicial to the fine control of the deformation and tearing of the passage hole (9) with the closure nut (4). The additional fusible washer (13) is provided with a passage hole (14) whose geometry can coincide or not with that of the passage hole (9) of the other fusible washer (5).

Two or more loose fusible washers (5), (13), successively positioned one on top of the other, can also be rigidly joined together by suitable means of fixing in order to form a single body or composite piece. In that case, a complex fusible washer is achieved starting from two simple fusible washers (5) and (13), which successively offer two passage holes (9) and (14) for the closure nut (4).

The base plate (2) of the post (1) of the safety barrier or parapet, and also the anchor bolts (3), the closure nuts (4), the fusible washers (5), (5'), (5"), (13) and the spacers (12) described in this invention, is preferably made of metallic materials (for example, steel and its alloys, aluminium and its alloys, etc.).

In order to fix a base plate (2) of a post (1) of a barrier or parapet in rigid ground (7), one normally has one, two or more sets of bolt (3), nuts (4) (11) and fusible washers (5), (5') or (5") with spacer (12) which can furthermore be accompanied (on the same plate) with other "non-fusible" direct anchor bolts or conventional rigid direct anchors. One normally has the fusible anchor bolts (3) in the forward part (3') of the base plate (2) of the post (1) according to the direct of travel of the traffic (which is the side where the impact of a vehicle is going to be received) and the "non-fusible" direct or rigid anchor bolts in the rear part (3") of said base plate, as shown in FIG. 12. This arrangement of "fusible" anchors in the forward part and "non-fusible" ones in the rear is motivated by the fact that, normally, in the event of a vehicle impact it is the forward bolts that are subjected to the predominant traction stresses and the rear ones to the predominant compression stresses, and the direct anchoring mechanism with fusible washer (5) (5") responds solely to traction stresses.

FIG. 11 shows a fusible anchor device where both the anchor bolts (3') situated in the forward part of the base plate (2) of the post (1) of the safety barrier or parapet, and the anchor bolts (3") situated in the rear part, incorporate the fusible washer mechanism (5) with closure nut (4). FIG. 12 shows a fusible anchor device where the anchor bolts (3') situated in the forward part of the base plate (2) of the post (1) of the safety barrier or parapet incorporate the fusible washer mechanism (5) with closure nut (4) and the anchor bolts (3") situated in the rear part of the base plate (2) are "non-fusible" rigid anchors. With this latter arrangement, in the event of impact from a heavy vehicle, the forward anchors are released by virtue of fusibility with the rear ones remaining so that the base plate (2) is bent upwards and the post (1) of the barrier or parapet is raised up by a certain height, which manages to increase the total height of the barrier in contact with the vehicle and thereby improve the capacity for containment, stabilisation and redirection of the barrier or parapet. If the rear anchors (3") are also aligned or appreciably aligned, the set of rear bolts (3"), once the front ones have become decoupled (3'), start to behave like a joint, the plate (2) bends, the post (1) rises up and no further loads are transmitted to the ground (7). The functioning mechanism of this last configuration is the most suitable one for a high containment barrier or parapet and is shown in FIG. 13.

DESCRIPTION OF THE DRAWINGS

FIGS. 4a-4p illustrate cross-sectional views of fusible washers of different geometries according to embodiments of the present invention.

FIG. 13. Straight cross-section view of the sequence a) and b) of fusibility of a base plate with a section of vertical post of a safety barrier or parapet with two anchor bolts, one of them fusible with closure nut and "U" shaped fusible washer situated in the forward part of the base plate, and the other non-fusible anchor bolt with closure nut and conventional washer situated in the rear part of the base plate, showing the base plate bent following the release of the forward fusible anchor.

DESCRIPTION OF SPECIFIC EMBODIMENTS OF THE INVENTION

Figure 1:
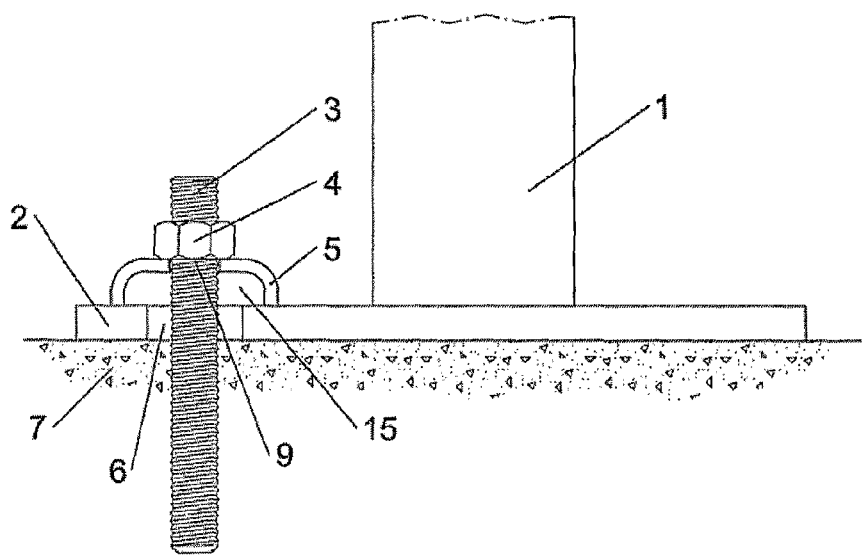
FIG. 1. Straight cross-section view of a base plate and a section of vertical post of a safety barrier or parapet with the fusible anchor bolt in rigid ground, with closure nut and fusible washer.
Figure 2:
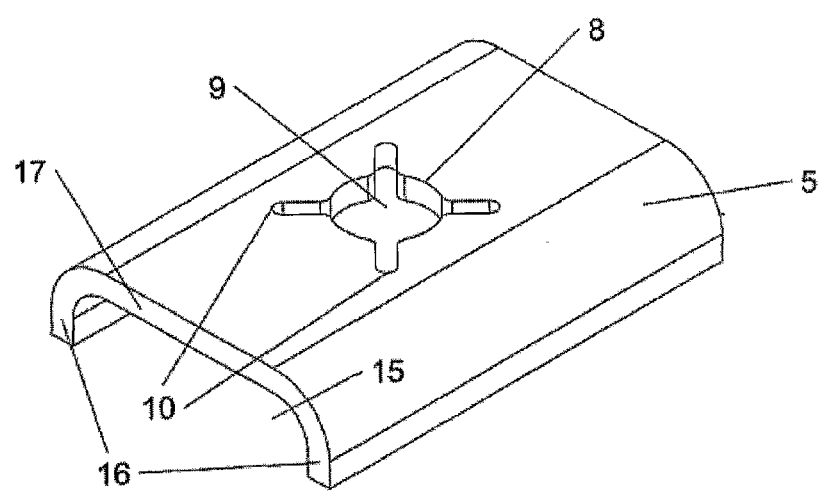
FIG. 2. Perspective view of a fusible washer in the form of a bar with a "U" shaped cross-section and with a star-shaped passage hole.
Figure 3:
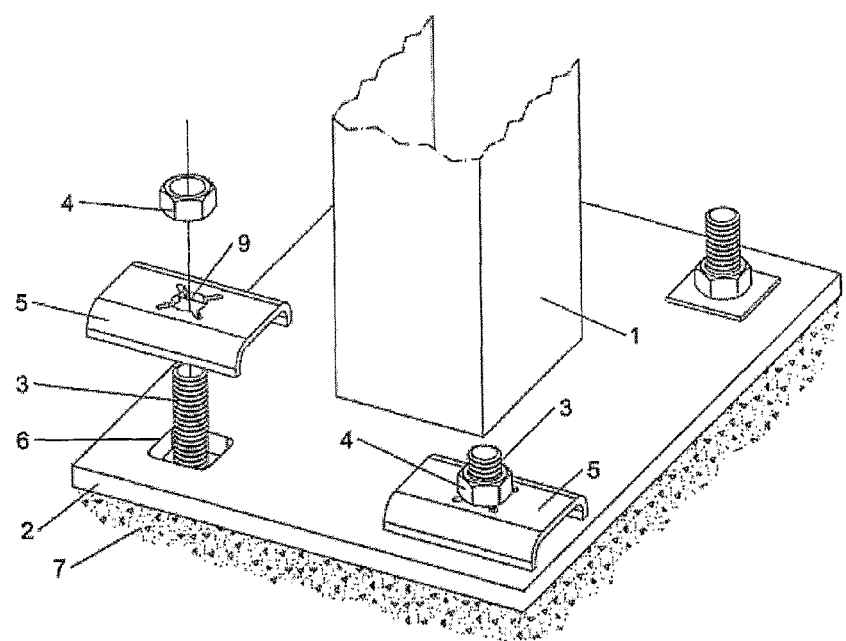
FIG. 3. Perspective view of a base plate and a section of vertical post of a safety barrier or parapet anchored in rigid ground, with a screwed fusible anchor bolt, another fusible anchor bolt in exploded view with its closure nut and fusible washer and a non-fusible rigid direct anchor bolt with conventional flat square washer.
Figure 5:
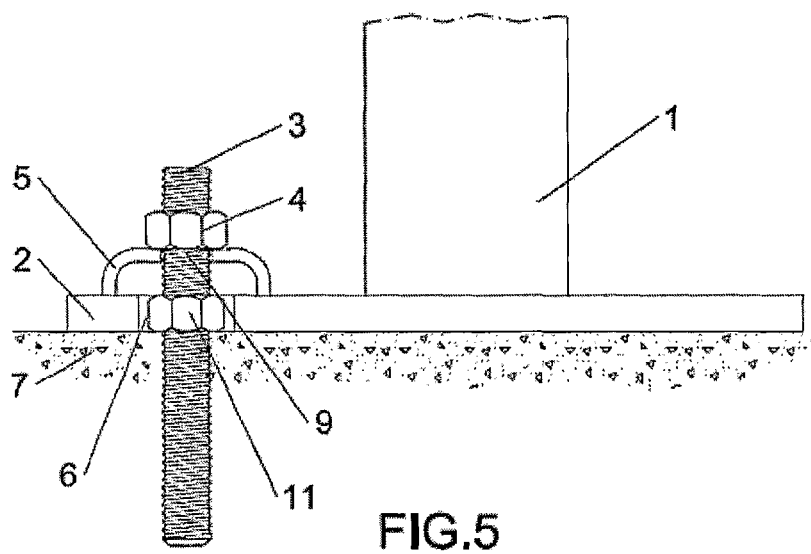
FIG. 5. Straight cross-section view of a base plate and a section of vertical post of a safety barrier or parapet anchored in rigid ground, with a fusible anchor bolt, with closure nut, "U" shaped fusible washer and centring nut.
Figure 6:
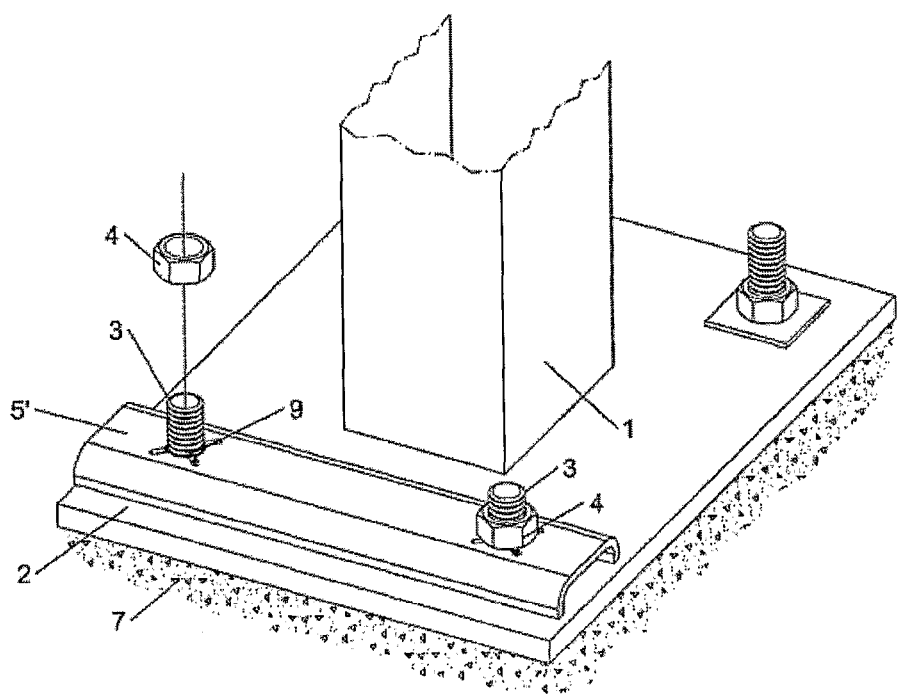
FIG. 6. Perspective view of the unit formed by a base plate with a section of vertical post of a safety barrier or parapet with two fusible anchor bolts with closure nut and a single fusible washer for both bolts and with a non-fusible rear bolt.
Figure 7:
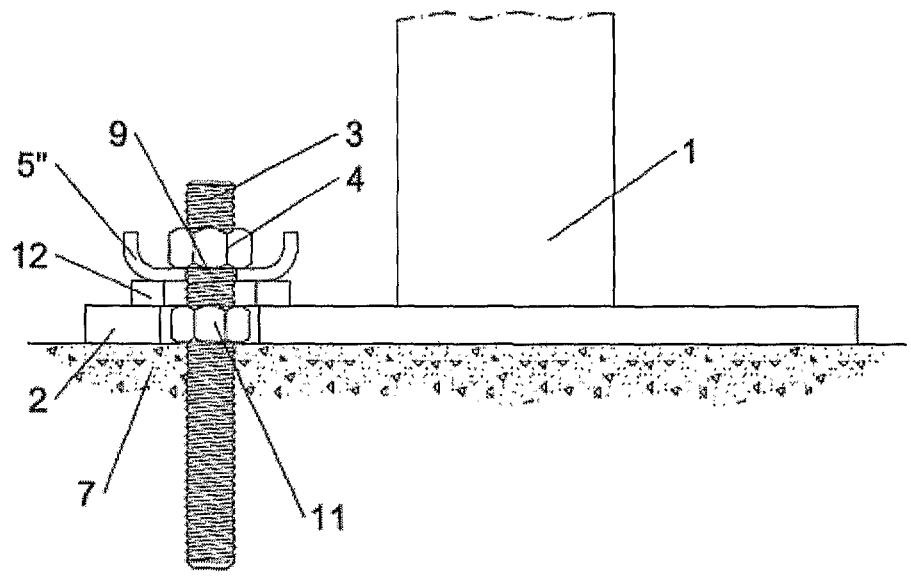
FIG. 7. Straight cross-section view of a base plate and a section of vertical post of a safety barrier or parapet anchored in rigid ground, with a fusible anchor bolt, with closure nut, "U" shaped fusible washer in the inverted position, spacer element and centring nut.
Figure 8:
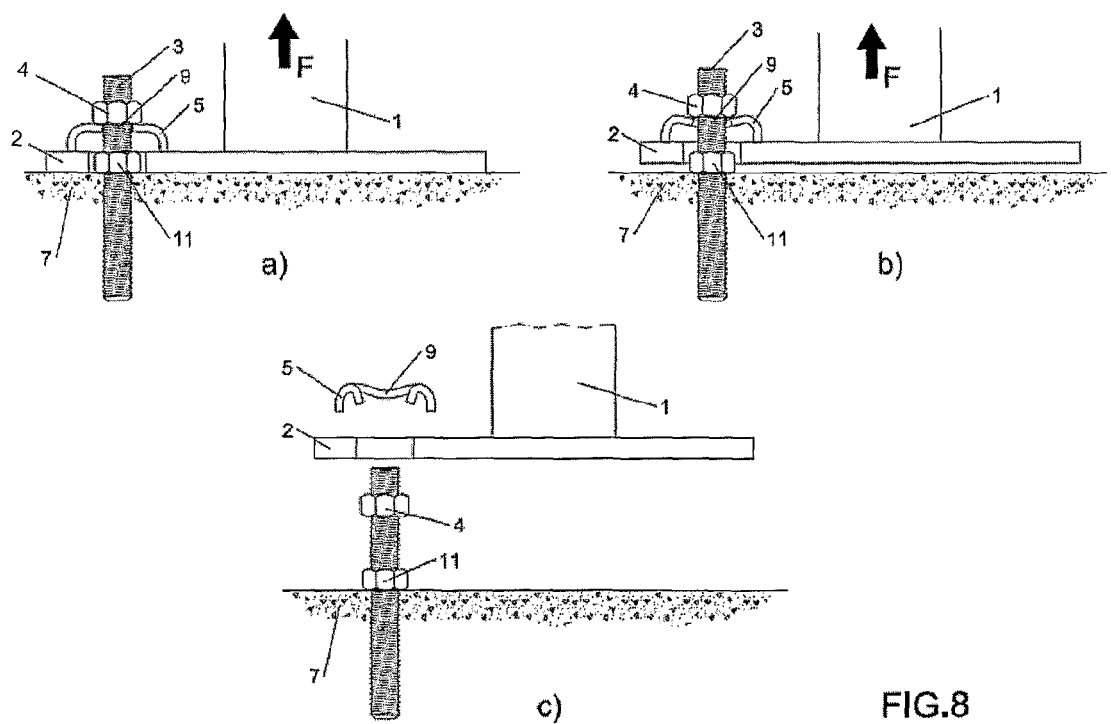
FIG. 8. Straight cross-section view of the functioning sequence a), b) and c) of a base plate with section of vertical post with a fusible anchor bolt during impact by a vehicle, wherein is shown the fusibility of the anchor by deformation and tearing of the passage hole for the fusible washer by the closure nut.
Figure 9:
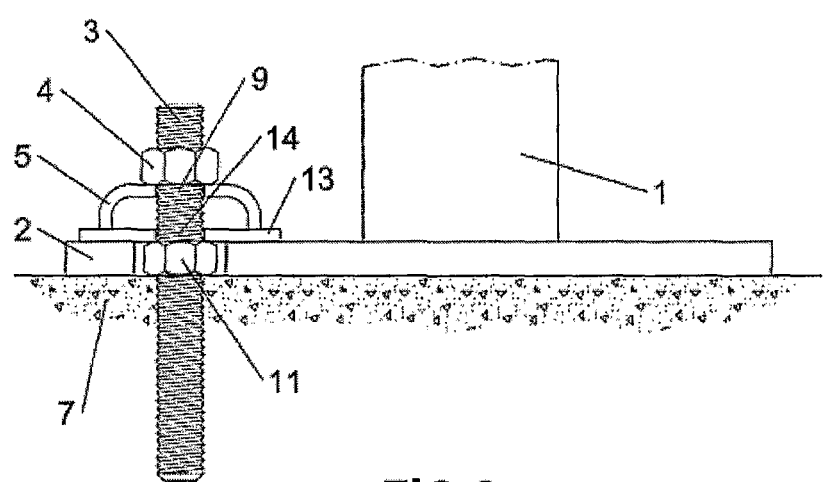
FIG. 9. Straight cross-section view of a base plate and a section of vertical post of a safety barrier or parapet anchored in rigid ground, with a fusible anchor bolt, with closure nut, "U" shaped fusible washer, another flat fusible washer and centring nut.
Figure 10:
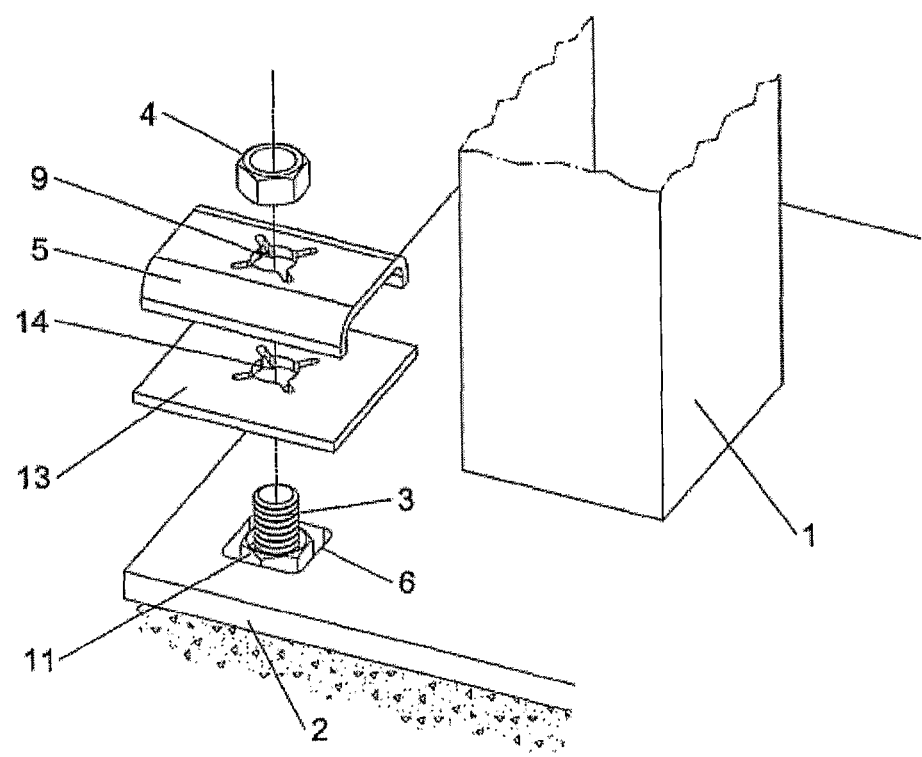
FIG. 10. Perspective view of a base plate and a section of vertical post of a safety barrier or parapet anchored in rigid ground, with a fusible anchor bolt, with closure nut, "U" shaped fusible washer, another flat fusible washer and centring nut, with the washers and closure nut in exploded view.
Figure 11:
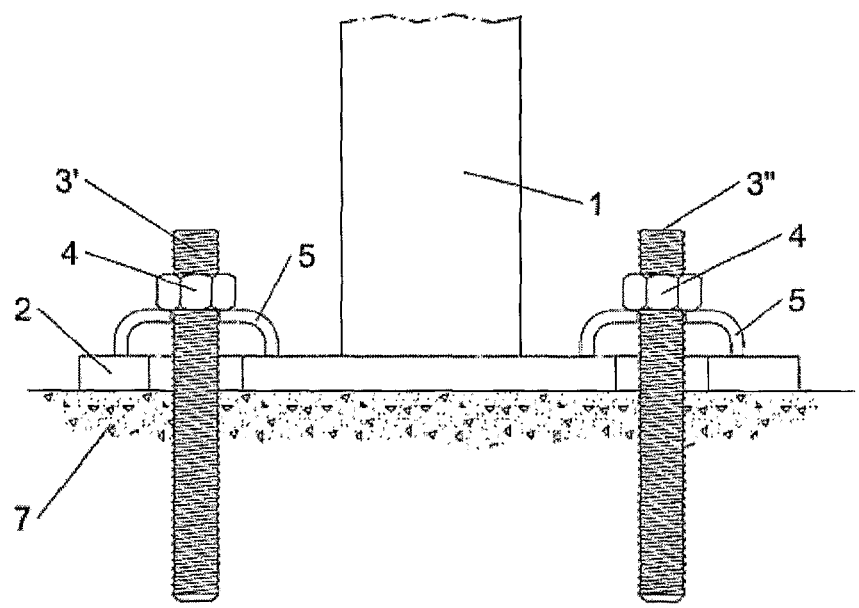
FIG. 11. Straight cross-section view of a base plate and a section of vertical post of a safety barrier or parapet with two fusible anchor bolts, both with closure nut and "U" shaped fusible washer, one of them situated in the forward part of the base plate and the other in the rear part of the base plate.

The preferred form of embodiment of the present invention provides a system of direct anchoring of the base plate (2) of a vertical or slightly inclined post (1) of a safety barrier or parapet of a road, comprising a plurality of anchor bolts (3) partly embedded in the ground (7) and rigidly fixed to same by suitable means, in such a way that all the anchor bolts (3) pass through corresponding holes (6) made for the purpose in the base plate (2) and are fixed to them by means of a closure nut (4) and a fusible washer (5), manufactured from a rectangular plate or sheet bent in a "U" shape, positioned in such a way that the central core or face (17) of the washer (5) remains in the upper horizontal position and the two wings (16) in the vertical position and supported internally on the base plate (2).

The passage hole (9) of the bolt through the fusible washer (5) has a star shape with a central gap (8), preferably rounded, and a plurality of radii (10) arranged around the central gap (8) and connected to it, in such a way that, in the event of pressure on the lower part of the closure nut (4) from loads originated by the impact of a vehicle against the barrier or parapet, the metal flaps included between every two consecutive radii (10) of the star are bent downwards, deforming the hole (9) to the point of tearing it and permitting the closure nut (4) to pass completely through the centre (17) of the fusible washer (5), successively passing through the free space (15) of the interior of the washer (5) and then traversing the hole (6) of the base plate (2), with the bolt (3) thus becoming completely decoupled from the base plate (2).

The hole (6) of the base plate (2) of the post (1) of the safety barrier or parapet presents a shape that is preferably square, rectangular, rounded or elongated and has a size equal to or greater than that of the closure nut (4), in order to permit the passage thereof via the plate.

In order to achieve the correct centring of the fusible anchor bolt (3) with respect to the corresponding hole (6) of the base plate (2) during its installation in the ground (7), a centring nut (11) is provided threaded around the bolt, beneath the fusible washer (5) and above the surface of the ground (7), more or less contained in the hole (6) of the plate.

Figure 12:
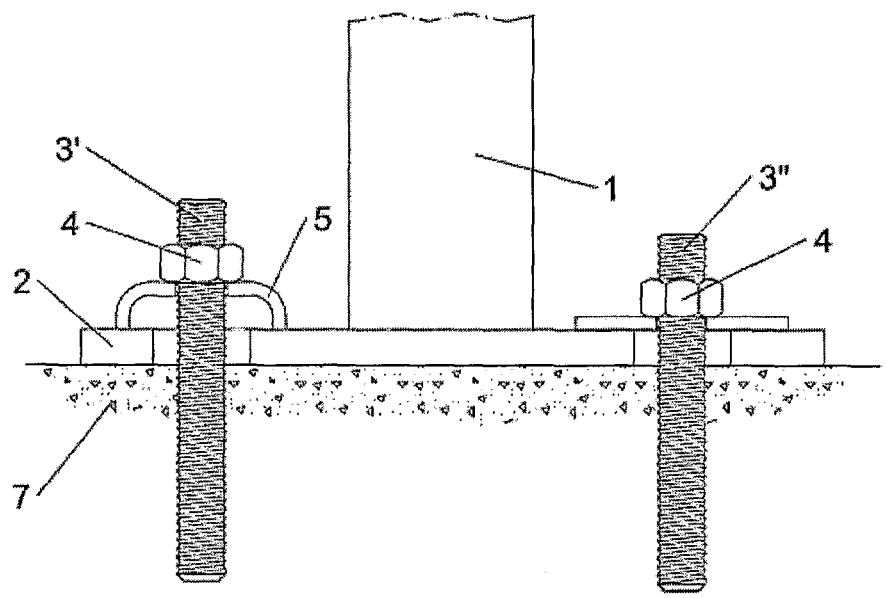
FIG. 12. Straight cross-section view of a base plate and a section of vertical post of a safety barrier or parapet with two anchor bolts, one of them fusible with closure nut and "U" shaped fusible washer situated in the forward part of the base plate, and the other non-fusible anchor bolt with closure nut and conventional washer situated in the rear part of the base plate.

Preferably, in order to execute the direct fusible anchor of the base plate (2) of a post (1) for a safety barrier or parapet, the forward part closest to the traffic is provided with a plurality of anchor bolts (3') with fusible washer (5), preferably aligned, and, in the rear part of the plate (2), another plurality of non-fusible or rigid anchor bolts (3"), with conventional washer, as shown in FIG. 12, such that when the forward bolts (3') are subjected to traction loads with levels greater than a threshold value, as a consequence of the actions transmitted to the plate (2) by the impact of a vehicle against the safety barrier or parapet, the unions of these forward bolts (3') with the base plate (2) are released but the unions of that plate with the rear bolts (3") remain, with which the plate (2) bends and the post (1) of the safety barrier or parapet is raised, as shown in FIG. 13.

The base plate (2) of the post (1) of the safety barrier or parapet, along with the anchor bolts (3), (3'), (3"), the closure nuts (4), the fusible washers (5), (5'), (5"), (13) and the spacers (12) described in this invention are preferably manufactured from metallic materials made of steel.

The invention claimed is:

1. A direct fusible anchoring system for a support post of a safety barrier or parapet in rigid ground comprising:
   a base plate fixed to the post, with fixing holes in the base plate,
   one or more anchor bolts, partly embedded in the ground and rigidly fixed to the ground, so that each of the one or more anchor bolts emerges from the ground and passes through a separate corresponding fixing hole of the base plate,
   the one or more anchor bolts remaining fixed to the base plate by corresponding closure nuts and one or more fusible washers with a fusible capacity located beneath the corresponding closure nuts, wherein each of the one or more fusible washers are in the form of a longitudinal bar with a cross-section in the form of a "C", and
   each of the one or more fusible washers having
      a central core, in a horizontal position or slightly inclined position, forming an upper face of the washer in contact with one of the corresponding closure nuts;
      two side wings, with lower ends of the side wings resting on the base plate; and
      at least a bolt passage hole located in the upper face of the washer, the bolt passage hole having a size less than a size of the corresponding closure nut; so that in the event of an impact from a vehicle against the safety barrier or parapet the bolt passage hole can be progressively deformed by the corresponding closure nut, allowing said corresponding closure nut to pass completely through the washer, wherein the bolt passage hole has a star shape, with a central gap of a size less than the size of the corresponding closure nut; and a plurality of elongated holes in the form of concentric radii connected to the central gap.

2. The direct fusible anchoring system for a support post of a safety barrier or parapet in rigid ground according to claim 1, further comprising for each of the one or more fusible washers, a spacer element provided between the central core of the washer and the base plate.

* * * * *